United States Patent [19]

Heynau

[11] Patent Number: 4,700,351
[45] Date of Patent: Oct. 13, 1987

[54] ACTIVE Q-SWITCHED LASER CARTRIDGE

[75] Inventor: Hans A. Heynau, Norwalk, Conn.

[73] Assignee: United Technologies Corporation, Hartford, Conn.

[21] Appl. No.: 792,350

[22] Filed: Oct. 29, 1985

[51] Int. Cl.⁴ .......................................... H01S 3/117
[52] U.S. Cl. ..................................................... 372/13
[58] Field of Search ........................... 372/13, 102, 10

[56] References Cited
U.S. PATENT DOCUMENTS
4,057,770 11/1977 Henningsen et al. ............... 372/102

Primary Examiner—Gene Wan
Attorney, Agent, or Firm—Francis J. Maguire, Jr.

[57] ABSTRACT

An active Q-switch integral laser cartridge is made of an acoustic transmitting body having a photoelastic laser medium in a part thereof for propagating and coupling both optical and acoustic waves. The photoelastic laser medium and the acoustic transmitting body may be made of substantially the same or similar base material.

3 Claims, 5 Drawing Figures

ACTIVE Q-SWITCHED LASER CARTRIDGE

TECHNICAL FIELD

This invention relates to high-power, short-pulse lasers, and particularly to such lasers with an active Q-switch.

BACKGROUND ART

The Q-switch technique is used in high-power pulsed lasers to temporarily block the amplification medium while exciting it beyond the degree ordinarily needed for continuous oscillations. A Q-switch is an optical switch for blocking a light transmission path. The blocking or shutter action inhibits laser action while the number of excited atoms increases. Once the energy stored by the excited atoms reaches a level necessary to sustain the required high power pulse, the shutter is abruptly "opened" and the stored energy is released in a brief time as a high power pulse. This fast rise time opening of the Q-switch is a key requirement.

Various materials have been used as pulsed laser amplifying media. For example, neodymium ions in crystals such as yttrium aluminum garnet (Nd:YAG) have been successfully used in an optically pumped solid-state laser providing peak output powers on the order of several megawatts in a pulse lasting 20 nanoseconds. Although some lasers are three-level devices or media, i.e., after excitation from a ground state to a high-energy state, atoms quickly relax to an emitting state, the Nd:YAG laser uses a fourth level as a terminal level for the laser transition. Relaxation to the ground state does not produce any optical radiation. Compared to a three-level laser, population inversion is more easily achieved and requires relatively low pumping light intensity.

In the past, Q-switched solid-state lasers comprised individual elements, e.g., mirrors, rod, and fast Q-switch, each of which had to be individually mounted and optically aligned. For many applications, accurate optical alignment had to be maintained over a wide range of temperature, shock, and vibration conditions. Many individual parts had to be made which added to the cost.

An improvement to this situation was the passive Q-switch laser cartridge. A cartridge unit was constructed in which the elements were bonded together in one integral structure. A problem with the passive Q-switch laser cartridge, however, is that it is only applicable to the case of a passive Q-switch element. Although passive Q-switch elements are known for the ruby and neodymium laser wavelengths (0.6943 and 1.06 microns, respectively), suitable materials have not been found for other wavelengths of interest such as 1.54, 1.73, 2.06 microns, etc. These wavelengths represent outputs from other solid-state lasers for which a small integral laser "cartridge-like" approach would be useful. However, a passive Q-switch does not exist at these wavelengths, and many other wavelengths of interest, and an active Q-switch element must be employed in these cases.

An acousto-optical active Q-switch device consists of a block of transparent photoelastic material, such as fused quartz. An ultrasonic transducer is bonded to one face, an absorbing material bonded to an opposite face and a radio frequency (RF) power source is provided for driving the ultrasonic transducer to generate a beam of acoustic waves in the photoelastic block. The wavelength of the sound waves is selected to be comparable in magnitude to the diameter of the light beam. The interaction of the light beam emitted by the laser medium with the acoustic waves in the photoelastic block results in Bragg-effect scattering of the light beam thus "spoiling" the resonant quality (Q) of the optical cavity. Laser oscillations are inhibited and the population of excited atoms increases until the stored energy reaches a level sufficient to sustain the desired pulse. Once the level is reached, the ultrasonic beam is turned off, the Q of the optical cavity is restored and the stored energy is suddenly released resulting in a high-peak power laser output pulse.

U.S. Pat. No. 3,464,027, LASER MODULATION BY FOCUSED ACOUSTIC ENERGY, to DeMaria, patented Aug. 26, 1969, discloses a modulated laser wherein the transducer is formed with a hole therethrough adapted to receive a laser rod. The thick, low frequency transducer, in this case, is bonded to the rod, which is used as both an acoustic medium and a laser amplifying medium for low frequency modulation.

U.S. Pat. No. 3,828,276, HIGH EFFICIENCY ACOUSTO-OPTICAL Q-SWITCH, to Cohen, patented Aug. 6, 1974, discloses a laser Q-switch of the type in which optical alignment of each element is required. See also U.S. Pat. No. 4,276,519.

U.S. Pat. No. 3,435,372, ULTRASONIC MODULATOR HAVING A CYLINDRICAL TRANSDUCER, to Aas et al, patented Mar. 25, 1969, discloses a tubular cylindrical transducer placed around and concentric with a laser rod and filled with a suitable liquid. The transducer is driven at the radial resonance frequency of the rod. The ultrasonic energy produced by the transducer is coupled through the liquid and focuses in the laser rod to produce a radial resonance in the laser rod. This radial standing wave spoils the "Q" of the laser optical cavity, and the laser energy is gated at a frequency directly proportional to the frequency of the low frequency standing wave.

U.S. Pat. No. 3,544,916, MULTIPLE FREQUENCY ULTRASONIC CONTROL FOR LASERS, to Angelbeck, patented Dec. 1, 1970, discloses a pair of low frequency cylindrical transducers directly bonded to a laser rod, each transducer driven at an ultrasonic frequency slightly different by an amount equal to the modulation frequency desired for the laser. The transducers are positioned immediately adjacent to one another.

DISCLOSURE OF THE INVENTION

The object of the present invention is to provide an integral, fast, active Q-switched laser cartridge.

According to the present invention, a body of ultrasound transmitting base material has a laser medium forming a laser cavity within a part of the body, the base material of the laser medium being substantially the same as the body or similar except for having an additional laser amplifying material dispersed for sustaining and propagating a coherent light pulse. The laser medium must be photoelastic and the body may be. The laser portion of the body also propagates acoustic energy transmitted or coupled thereto and generated throughout the body by means of a thin high frequency acoustic transducer attached thereto. The soundwaves generated by the transducer inhibit impending coherent light beam oscillations in the laser amplifying medium until a selected population inversion is reached at which time the transducer is shut off and a high peak power laser pulse is generated.

In further accord with the present invention, the laser medium may be made of a separate laser rod piece inserted into a bore within the body of ultrasound transmitting base material, which need not be photoelastic, and bonded thereto.

In still further accord with the present invention, the ultrasound transmitting base material body may also act as an optical pump cavity for exciting the laser.

In still further accord with the present invention, the ultrasound transmitting material of the body may be made of a nonphotoelastic, nonlaser material which is compatible with the laser rod over the range of expected environmental conditions.

The integral acousto-optic Q-switch, according to the present invention, solves the optical alignment problem of the prior art for lasers in which passive Q-switch arrangements are not available. Also, losses associated with optical entrance and exit faces in the acousto-optic medium are avoided by making the laser rod material part of the acousto-optic medium. This may be achieved, according to the teachings of the present invention, by fabricating the rod and acousto optic Q-switch structure from a single piece of the laser rod material or by fabricating the acoustic-optic structure (transducer, initial acoustic medium, terminating acoustic medium, and traveling acoustic wave absorber material) as one piece with a hole through it and bonding the acoustic-optic structure to the laser rod. The acoustic medium and bonding material are selected to have good acoustic transmission properties and to be compatible with the laser rod over the range of expected environmental conditions. In some cases the acoustic coupling material is also selected for good optical transmission properties when it is to be used within the optical pump cavity of the laser.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
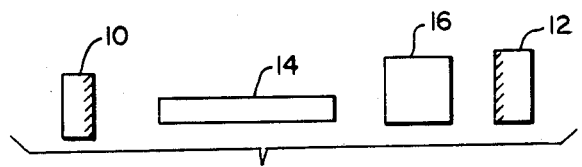
FIG. 1 is an illustration of a prior art active Q-switched solid-state laser having individually mounted and aligned optical elements.

FIG. 1 is an illustration of a Q-switched solid-state laser in which a pair of mirrors 10,12, a laser rod 14, and a Q-switch 16 are each individually mounted and optically aligned with one another. For many applications, accurate optical alignment must be maintained over a wide range of temperature, shock, and vibration conditions. Numerous individual parts are required to be made which add to the total cost and make the resulting device rather expensive.

Figure 2:
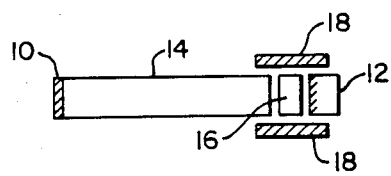
FIG. 2 is an illustration of a prior art passive Q-switch laser cartridge, which was an improvement over the FIG. 1 configuration.

An improvement over the FIG. 1 configuration is the passive Q-switch laser cartridge shown in FIG. 2. In a cartridge sleeve 18, the individual elements, numbered similarly to the elements of FIG. 1, are bonded together in one integral structure. One well-known type of passive Q-switch is a saturable absorber which operates as an optical absorption filter at the lasing frequency only when unsaturated. More particularly, a saturable absorber may be composed of a liquid or solid solution of an organic dye or may be gaseous in form. The saturable absorber, when unsaturated, absorbs a sufficient number of photons to maintain the gain of the laser below unity. However, the active absorbing photons causes the saturable absorber to ultimately become saturated at which time the optical absorption filter becomes relatively transparent, permitting the gain of the laser to rise to a point above unity and a single pulse of coherent radiation is produced.

Unfortunately, no such absorbers are known for lasers in the human eye-safe wavelength region, i.e., greater than 1.4 microns. Such wavelengths are referred to as eye-safe because the fluid in the human eye attenuates incoming laser radiation above 1.4 microns before it can be brought to a focus on the back of the eye and damage the retina.

Figure 3:
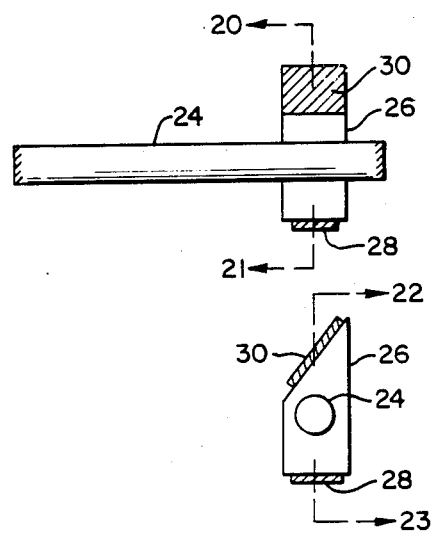
FIG. 3 is an illustration of an integral acousto-optic active Q-switch, according to the present invention, and showing the direction of view for FIG. 4.
Figure 4:
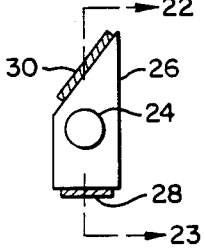
FIG. 4 is a side view of the cartridge of FIG. 3, showing the direction of view for FIG. 3.

FIG. 3 is an illustration of an integral active Q-switched laser cartridge, according to the present invention. FIG. 4 is a side view of the device of FIG. 3 along phantom lines 20,21, as shown in FIG. 3, while FIG. 4 shows the direction of view 22, 23 of FIG. 3. In FIG. 3, a photoelastic laser rod 24 is inserted within a bore of an acoustic transmitting body 26 and bonded thereto using an adhesive. An acoustic transducer 28 is bonded to the body 26. Electrodes may be attached to the transducer which permit electrical excitation thereof for producing acoustic waves within the body 26 which have a wavelength comparable to the beam width of the coherent laser light in the rod and which are coupled through the adhesive to the laser rod 24, which also acts as an acoustic medium. According to the teachings of the present invention, the laser rod 24 and the body 26 are made of substantially the same or similar base materials, e.g., YAG or glass. Of course, the laser rod may have additional materials dispersed throughout, e.g., Nd or Erbium, respectively, which are necessary for light amplification and which may not be present in the body. The acoustic waves exit the laser rod 24 through to the surrounding body 26 and are absorbed by an acoustic absorber 30 which is angled in such a way so as to absorb impinging acoustic waves without reflection back into the rod. This prevents acoustic standing waves in the laser medium and promotes rapid quenching of the acoustic energy. By making the body of an acoustic transmitting material of the same or similar base material as the laser rod, environmental effects such as temperature will affect both pieces equally.

It should be understood that the integral Q-switch cartridge of FIGS. 3 and 4 need not necessarily be made of two separate pieces but may instead be made of a single piece in which the rod and body are fabricated from a single block. Of course, the relative sizes and lengths of the rod with respect to the body are not material to the inventive concepts disclosed.

Figure 5:
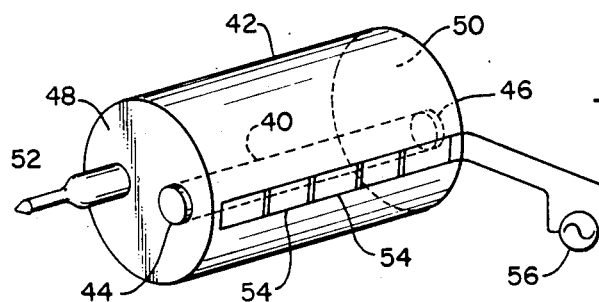
FIG. 5 is an illustration of an integral optical pump cavity type of acousto-optic active Q-switched laser cartridge, according to the present invention.

FIG. 5 is an illustration of another embodiment of an integral, optical pump cavity, active Q-switched laser cartridge according to the present invention. A laser rod 40 is inserted within a bore in an acoustic transmitting body 42 and bonded thereto by means of a suitable optical grade adhesive. Laser mirrors 44,46 are placed at each end of the laser rod by thin film dielectric deposition techniques. Optical pump wavelength mirror surfaces are also evaporated, chemically deposited, or painted onto the ends of the acoustic transmitting body at 48, 50 and around the outside barrel of the body 42. A flashlamp 52 is inserted into a bore within the acoustic transmitting material and serves to excite the atoms within the laser rod. A series of acoustic transducers 54 are attached to the outside of the photoelastic body 42 and an excitation source 56 produces vibrations in the transducers which in turn produce acoustic waves within the acoustic transmitting body 42 which are coupled through the photoelastic laser rod 40 to produce the active Q-switch phenomenon. Thus, it will be observed that the acoustic transmitting body 42 of FIG. 5 is used not only as an acoustic medium, as in FIGS. 3 and 4, but also as an optical medium for pumping. An acoustic wave absorbing material (not shown) may be wrapped or attached to the outside of the barrel of the body in order to absorb acoustic waves which have passed through the laser rod. The device disclosed in FIG. 5 may of course be fabricated of many different materials. A glass body 42 and an Erbium-glass laser rod is one selection.

It will be understood by those skilled in the art that although the invention has been shown and described with respect to a best mode embodiment thereof, that the foregoing and various other changes, omissions and deletions in the form and detail thereof may be made therein without departing from the spirit and scope of this invention.

I claim:

1. An active Q-switched laser cartridge, comprising:
   a body of acoustic transmitting base material for acting as a medium for propagating acoustic energy;
   a photoelastic laser medium, forming a laser cavity part of the body and having substantially the same or similar base material as the body except having an additional laser amplifying material dispersed within the laser medium for sustaining and propagating a coherent light beam pulse at a selected population inversion and also for propagating acoustic energy;
   an acoustic transducer attached to the body for intermittently generating acoustic waves therein for intermittently inhibiting impending coherent light beam oscillations until the selected population inversion is reached at which time it is quickly quenched; and
   an acoustic absorber for terminating the acoustic waves to facilitate rapid quenching of the acoustic energy and prevent standing waves in the laser medium.

2. The cartridge of claim 1, wherein the laser medium is a separate laser rod bonded to the body within a bore thereof.

3. The cartridge of claim 1, wherein said body also acts as an optical pump cavity outside the laser cavity part.

* * * * *